United States Patent [19]

Smith et al.

[11] Patent Number: 4,750,276
[45] Date of Patent: * Jun. 14, 1988

[54] IMPINGEMENT THERMAL TREATMENT APPARATUS WITH COLLECTOR PLATE

[75] Inventors: Donald P. Smith, 4630 Woodfin Dr., Dallas, Tex. 75220; Virgil L. Archer; William W. Plumb, both of Dallas, Tex.; Jarald E. High, Grand Prairie, Tex.; Robert W. Foreman, Euless, Tex.

[73] Assignee: Donald Paul Smith, Dallas, Tex.

[ * ] Notice: The portion of the term of this patent subsequent to Oct. 19, 1999 has been disclaimed.

[21] Appl. No.: 879,848

[22] Filed: Jun. 27, 1986

Related U.S. Application Data

[63] Continuation of Ser. No. 608,764, May 10, 1984, abandoned, which is a continuation-in-part of Ser. No. 487,583, Apr. 22, 1983, abandoned.

[51] Int. Cl.[4] ............................................. F26B 15/14
[52] U.S. Cl. ............................................ 34/149; 34/189; 34/197; 34/225; 34/231; 126/21 A; 99/475; 99/477; 219/400
[58] Field of Search ................. 34/149, 189, 194, 196, 34/197, 222, 225, 229, 231; 99/474, 476, 477, 483; 126/21 A; 219/400; 432/152, 176, 199

[56] References Cited

U.S. PATENT DOCUMENTS

| | | | |
|---|---|---|---|
| 1,412,598 | 4/1922 | Ayres et al. | 34/231 |
| 2,669,788 | 2/1954 | Drum et al. | 34/231 |
| 3,548,153 | 12/1970 | Kells | 219/400 |
| 3,864,846 | 2/1975 | Hayashi | 34/189 |
| 3,884,213 | 5/1975 | Smith | 34/229 |
| 3,995,375 | 12/1976 | Weinmann | 34/155 |
| 4,010,349 | 3/1977 | Lee | 219/400 |
| 4,029,463 | 6/1977 | Johansson et al. | 219/400 |
| 4,077,528 | 3/1978 | Santen | 34/189 |
| 4,154,861 | 5/1979 | Smith | 34/34 |
| 4,173,077 | 11/1979 | Birke et al. | 34/222 |
| 4,289,792 | 9/1981 | Smith | 219/10.55 R |
| 4,338,911 | 7/1982 | Smith | 126/21 A |
| 4,354,549 | 10/1982 | Smith | 165/62 |
| 4,408,986 | 10/1983 | Soraya et al. | 432/9 |
| 4,409,453 | 10/1983 | Smith | 34/1 |
| 4,479,776 | 10/1984 | Smith | 432/144 |

Primary Examiner—Larry I. Schwartz
Attorney, Agent, or Firm—Gerald G. Crutsinger; John F. Booth; Norman L. Gundel

[57] ABSTRACT

Impingement heating or cooling apparatus that employs an axial flow fan, a plenum, collector and a columnating assembly for directing jets of a temperature controlled gas against the surface of a food product. Means for contacting a first layer of food products with impinging jets of a temperature controlled gas and for simultaneously contacting a second layer of food products with an alternating, convective flow of a temperature controlled gas is also provided.

16 Claims, 4 Drawing Sheets

IMPINGEMENT THERMAL TREATMENT APPARATUS WITH COLLECTOR PLATE

CROSS REFERENCE TO RELATED APPLICATION

This is a continuation of application Ser. No. 06/608,764, filed May 10, 1984, (now abandoned) which is a continuation-in-part of application Ser. No. 487,583, filed Apr. 22, 1983, now abandoned.

TECHNICAL FIELD

This invention relates to apparatus that is useful for heating, cooling, drying or humidifying food products. One aspect of the invention relates to an impingement heating or cooling apparatus that employs an axial flow fan, a plenum, a collector plate and a columnating assembly for directing jets of a temperature controlled gas against the surface of a food product while providing relative motion between the columnating assembly and the food product. Another aspect of the invention relates to an apparatus adapted to accommodate a plurality of vertically stacked and spaced apart layers of food products and further comprising a reciprocating columnating assembly adapted to control the flow of a temperature controlled gas so as to impinge substantially perpendicularly against the top layer of food products and to contact each lower layer of food products by alternating horizontal convection flow. A further aspect of the invention relates to apparatus comprising a reciprocating columnating assembly disposed above food products that are to be thermally treated in combination with at least one conductive heating plate disposed beneath at least a portion of the food products. Yet another aspect of the invention relates to apparatus for thermally treating a food product first by impingement air flow and subsequently by horizontal convection flow in alternating directions. The apparatus of the invention is useful for thermally treating food products with a temperature controlled gas that is either hotter or colder than the food products, and can also be adapted to either dry or humidify the food product as desired.

BACKGROUND OF THE INVENTION

The use of a columnating assembly for directing a plurality of jets of a temperature controlled gas against the surface of a food product is known. Such apparatus is disclosed, for example, in U.S. Pat. Nos. 3,884,213; 4,154,861; 4,289,792; 4,338,911; and 4,409,453. Notwithstanding the advantages that are achieved through the use of such apparatus, there has remained a need for an impingement heating or cooling apparatus that can effectively and efficiently deliver a flow of temperature controlled gas from a relatively large diameter axial flow fan through a closely spaced columnating assembly that is perpendicular to the axial direction in such manner that the flow of gas is substantially uniform through the orifices distributed across its surface. The direct alignment of an axial flow fan with a columnating assembly is preferred because of the shorter air circulation path that can thereby be obtained. A very short air circulation path makes particularly efficient use of power input to a fan or blower. This enhanced efficiency is multiplied when the unit is used in a refrigerated space, where energy used to drive the blower produces heat which must be offset by increased refrigeration capacity, adding to operating costs.

Large diameter axial flow fans are desirable for use in impingement heating and cooling devices because they permit rapid acceleration of the air mass without having to change the direction of travel of the air mass while passing through the fan. This helps in achieving the high pressure needed to form the columnar jets of temperature controlled gas at a minimal energy cost. Also, by placing the fan as near as possible to the columnating assembly, it is possible to reduce the overall bulk of the unit. This is particularly important, for example, in commercial situations where additional space is either unavailable or prohibitively costly.

However, the use of a large axial flow fan discharging directly against a columnating assembly presents a major design problem in that a cone of low pressure air forms downstream of the fan hub, resulting in a wind "shadow" on the center of the columnating assembly. This low-pressure cone is not a problem in most other axial flow applications, either because the air is fed into a large plenum where pressure equalizes anyway, or because the target of the moving air is far enough downstream to be beyond the tail of the cone and thus out of the "shadow."

Various means have been analyzed and tested in an effort to find suitable apparatus for redirecting high velocity air that is discharged from the fan blade tips back toward the central vortex. Neither flat radial plates nor concentric rings placed in the air stream have proven effective for redirecting air into a uniform pattern over the full surface of a perpendicularly disposed columnating assembly. Although directing vanes have been designed which are severe enough to fill the low pressure space, they have tended to do it at the expense of starving the outwardly disposed orifices of a columnating assembly. Inserting a long cone or a cylinder into the low pressure area or "shadow" can prevent the wasteful counterflow. However, this cone or cylinder effectively blocks any adjacent jets, and is thus not suitable for use in an application where the columnating assembly is situated relatively close, such as for example, less than about two fan diameters from the discharge point.

There also exists a need for an apparatus that can thermally treat a plurality of vertically spaced layers of food products in such manner that each layer of food products is subjected to a progressive thermal treatment cycle whereby it is first contacted with vertically impinging jets of a temperature or humidity controlled gas and is thereafter contacted by a horizontal or alternating horizontal convective flow of such gas.

SUMMARY OF THE INVENTION

The apparatus of the present invention is adapted to distribute a flow of pressurized air being discharged from an axial flow fan substantially evenly across the surface of a columnating assembly disposed in substantially perpendicular relation to the fan axis and to convert the moving air mass into columnated jets by passing the air through an array of orifices in the columnating assembly. These columnated jets are directed so as to impinge against a layer of food products disposed in substantially parallel relation to the columnating assembly. These columnar jets greatly accelerate the transfer of thermal energy and/or moisture between the air and the food product upon which the jets impinge. This improved transfer of thermal energy and/or moisture between the impinging air and the surface of the food product has applicability for heating, cooling, drying and humidifying.

The use of relative motion between impinging gas jets and the surface of the food product to provide a sweeping effect which further increases the thermal energy and/or moisture transfer rate has previously been disclosed. With the present invention, however, an apparatus is provided that is adapted to direct vertically impinging gas jets against a first layer of food products while simultaneously providing alternating, horizontal convective air flow to at least one additional layer of food products that is not subjected to the impingement air flow.

According to one embodiment of the invention, a food support assembly is provided that will progressively cycle layers of food products through the apparatus in such manner that each layer is first subjected to impingement air flow and is thereafter subjected to the alternating, horizontal convective air flow.

According to another embodiment of the invention, heating elements are provided within the food support assembly to conductively heat the lower surface of food products disposed thereon while the upper surfaces of the food products are being subjected to either impingement or alternating, horizontal convective heating. Such heating elements can be individually thermostated independently of the temperature of the gas being circulated through the apparatus so as to provide a greater degree of control to the user.

According to another embodiment of the invention, an oven or cooler is provided which comprises an axial flow fan that is vertically aligned with a columnating assembly and has a collector plate disposed therebetween for equalizing the pressure distribution across the surface of the columnating assembly by causing temperature-controlled air discharged from the fan to be directed radially inward into the low pressure zone caused by the hub of the rotating fan.

According to another embodiment of the invention, the efficiency of the collector plate is improved by employing it in combination with curved directing vanes disposed on the side of the collector plate opposite to the fan which are adapted to receive the tangential flow of air discharged by the fan and redirect it centripetally so as to achieve a more equal pressure distribution across the center section of the columnating assembly.

According to another embodiment of the invention, the jet orifices in the columnating assembly are placed closely together in vee-shaped rows which are in turn spaced further apart to provide channels between the rows which facilitate the return of spent impingement air with minimum interference from the other jets.

The apparatus of the invention can be utilized as an oven by providing heating elements for imparting thermal energy to the recirculating air, or as a cooling apparatus by providing ambient or chilled air to the fan inlet, or as a cooling or freezing apparatus by providing refrigeration means for removing thermal energy from the recirculating air. Similarly, the apparatus of the invention can be utilized to humidify food products by providing spray nozzles for injecting moisture into the recirculating airstream, or by the addition of a water reservoir over which the air can be circulated. Finally, the subject apparatus can be successfully utilized as a dryer by circulating unsaturated air against the surface of the food products.

Other objects and improvements of the invention are further explained in the remainder of the specification.

BRIEF DESCRIPTION OF THE DRAWINGS

The subject invention is further described and explained in relation to the following drawings wherein.

Like numerals are used to designate like parts in all figures of the drawings.

DETAILED DESCRIPTION

Figure 1:
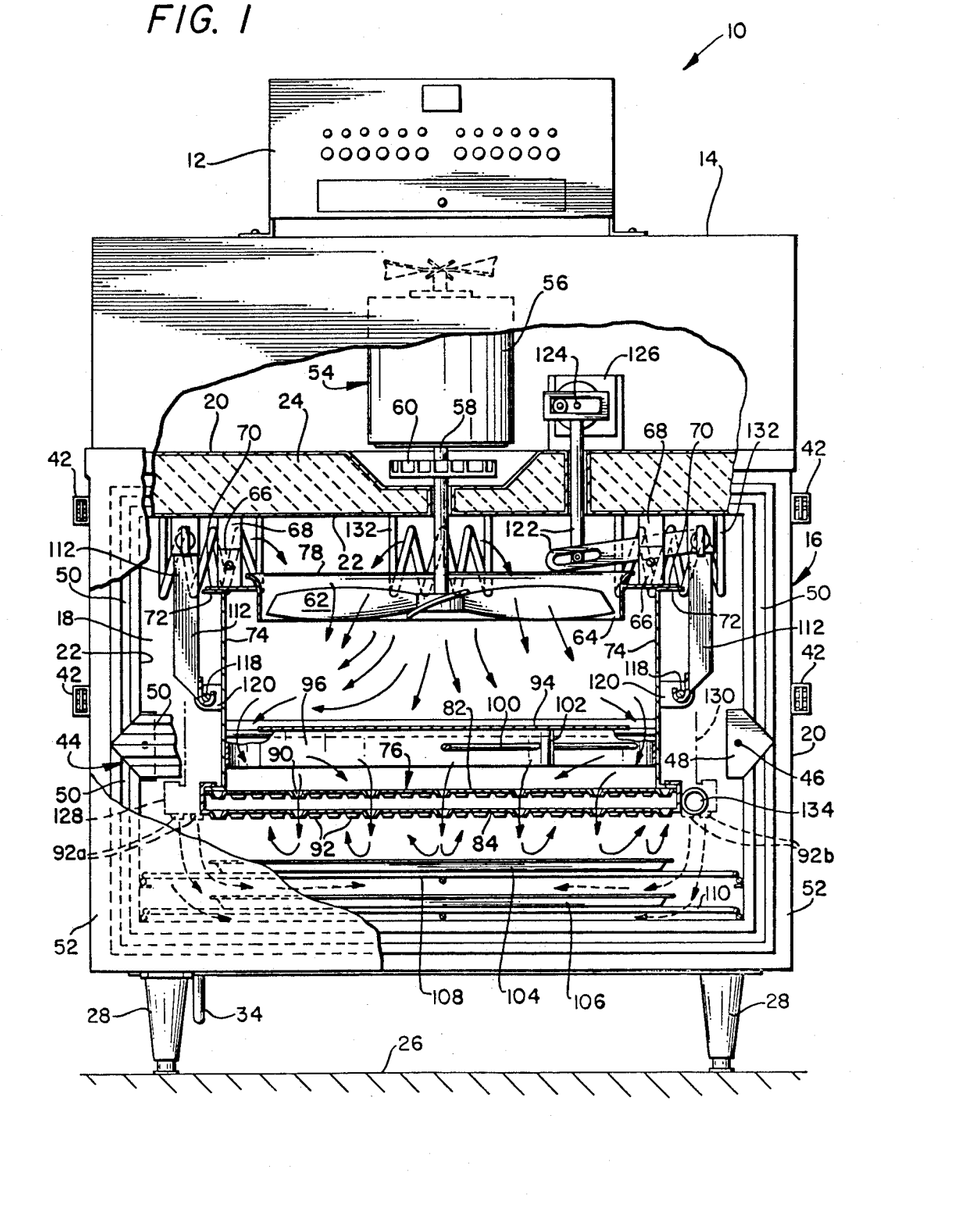
FIG. 1 depicts a partially broken away, sectional elevation view of a preferred embodiment of the invention.
Figure 2:
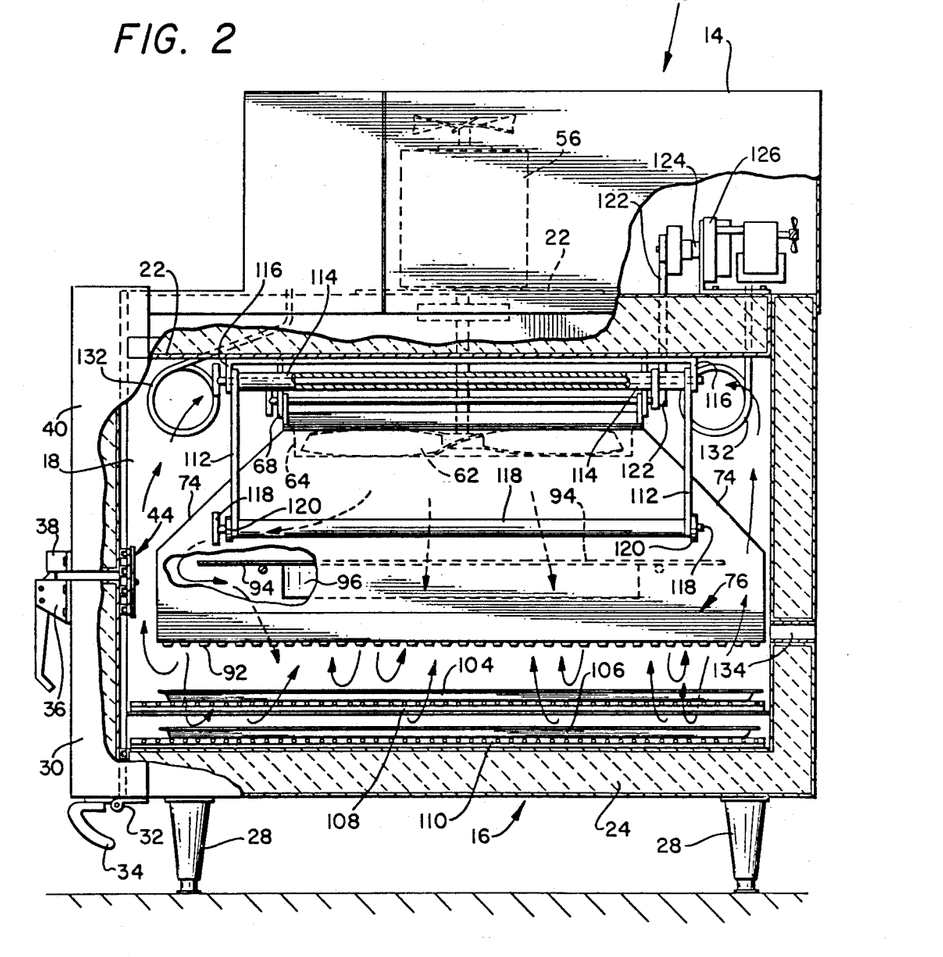
FIG. 2 depicts a partially broken away, sectional side elevation view of the apparatus shown in FIG. 1.

FIGS. 1-4 depict a preferred embodiment of the invention that is adapted to provide impingement heating to a first layer of food products and to provide alternating, convective flow heating in a horizontal direction to a second layer of food products that is disposed in spaced apart relation below the first layer. Referring to FIGS. 1-4, apparatus 10 preferably comprises control housing 12, motor housing 14 and heating cabinet 16. Air recirculation zone 18 within heating cabinet 16 is defined by outside wall 20 and inside wall 22 having insulating material 24 such as mineral wool disposed therebetween. As shown in FIGS. 1 and 2, heating cabinet 16 is supported above supporting surface 26 by adjustable legs 28. Access to the interior of heating cabinet 16 is provided by door 30 which is pivotally mounted to outside wall 20 of heating cabinet 16 by hinge 32. Stop 34 is provided to control the extent to which door 30 is permitted to pivot about hinge 32 when in the open position. Latch mechanism 36 connected to door 30 is adapted to engage receiver 38 of front panel 40, which is removably connected to outside wall 20 of heating cabinet 16 by latches 42. Horizontal support bar 44 extends across the front face of heating cabinet 16 to provide structural support and a sealing surface at the top edge of door 30 and the bottom edge of front panel 40. Horizontal support bar 44 is adapted to be removably attached to inside wall 22 of heating cabinet 16 by screws inserted through holes 46 in brackets 48. Polymeric gaskets 50 are provided around the perimeter of front face 52 of heating cabinet 16 and across horizontal support bar 44 to provide sealing engagement between the inside walls of door 30 and front panel 40 and front face 52 of heating cabinet 16.

Fan assembly 54 is mounted in the top wall of heating cabinet 16, and further comprises electric motor 56, rotating shaft 58, heat slinger 60, axial flow fan 62 and fan intake shroud 64. Fan intake shroud 64 is preferably maintained in a fixed position relative to top inside wall 22 of heating cabinet 16 by brackets 66 connected to hangers 68, which are in turn connected to inside wall 22. Fan shroud 64 is further adapted by means of flat, horizontal flange portions 70 to provide sliding engagement with cooperating flange portion 72 of plenum 74.

Plenum 74 is adapted to provide fluid communication between axial fan blade 62 and columnating assembly 76 disposed thereunder. Plenum 74 also serves to provide a physical barrier between the heated air being discharged by axial fan blade 62 and the spent air being recirculated around columnating assembly 76 and plenum 74 within air circulation zone 18 to inlet port 78 of shroud 64.

Figure 4:
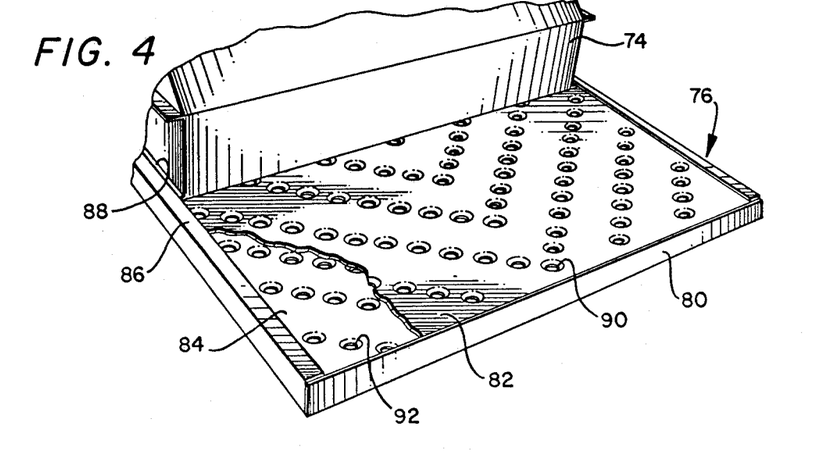
FIG. 4 is a detailed perspective view, partially broken away, of the columnating assembly employed in a preferred embodiment of the invention.

Columnating assembly 76 is further described in relation to FIGS. 1, 2 and 4. Columnating assembly 76 preferably comprises frame 80 adapted to support and maintain columnating plate 82 and jet plate 84 in substantially parallel and spaced apart relation so as to facilitate the formation of columnar jets of impingement air. Frame 80 is preferably adapted by means of flange portions 86 to slideably engage cooperating flange portions 88 of plenum 74 to facilitate maintenance, cleaning and the like. Columnating plate 82 and jet plate 84 further comprise an array of spaced-apart orifices 90, 92, respectively, which are preferably positioned in such manner that each orifice 90 in columnating plate 82 is axially aligned with a corresponding orifice 92 in jet plate 84. Each orifice 90, 92 is preferably a truncated, cone-shaped nozzle adapted to minimize dispersion of the airflow passing downward therethrough.

Although the pattern and spacing of orifices 90, 92 can be varied according to the particular application, the pattern depicted in FIG. 4 has proved to be particularly desirable for use with the subject apparatus. As shown in FIG. 4, orifices 90, 92 are disposed in a succession of vees in which the spacing between adjacent orifices is less than the spacing between adjacent vees. When orifices 90, 92 are arranged in this manner, spent impingement air rebounding from the surface of the food product is channeled horizontally along the spaces between the successive vees to the perimeter of columnating assembly 26 with minimal interference from the impingement air jets being discharged from orifices 92 in jet plate 84. Once the spent air reaches the perimeter of columnating assembly 76, it can recirculate upwards around plenum 74 to inlet port 78 of fan shroud 64.

Figure 3:
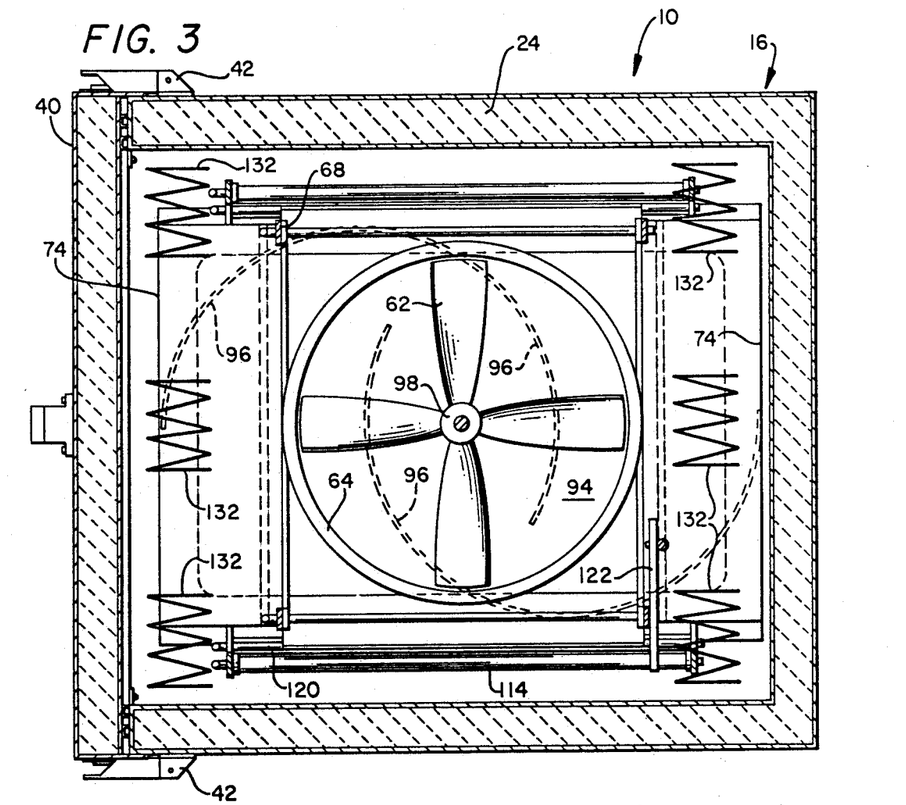
FIG. 3 depicts a simplified sectional plan view of the apparatus shown in FIGS. 1 and 2.

According to a preferred embodiment of the invention, and referring to FIGS. 1-3, collector plate 94 is disposed inside plenum 74 between axial fan 62 and columnating assembly 76 and is maintained in substantially parallel and spaced apart relation to columnating plate 82 of columnating assembly 76 to assist in uniformly distributing the flow of air discharged by axial fan 62 across the surface of columnating plate 82. In the embodiment shown in FIGS. 1-3, collector plate 94 is flat and rectangularly shaped. This configuration has proved to be useful for more evenly distributing the flow of heated air across the surface of columnating plate 82 than is otherwise possible. As shown in FIGS. 1-3, collector plate 94 is employed in combination with two curved directing vanes 96 which are adapted to direct a portion of the air flowing over collector plate 94 in a centripetal direction so as to redistribute the airflow over the centrally disposed, cone-shaped low pressure zone that would otherwise exist beneath hub 98 of axial fan 62.

The number, curvature and height of directing vanes 96 can vary within the scope of the invention, and the preferred configuration for a particular application will depend to some extent upon factors such as the fan diameter, fan blade pitch, distance from fan to collector plate, shape and area of collector plate, air velocity, and the like. Notwithstanding these considerations, however, the apparatus disclosed herein is particularly effective when the distance across collector plate 94 is less than about twice the sum of the diameter of fan 62 and the distance from fan 62 to collector plate 94, but is greater than or equal to about one half the diameter of fan 62; when the distance from fan 62 to collector plate 94 is less than about twice the diameter of fan 62; when the distance from collector plate 94 to columnating plate 82 is less than the distance from fan 62 to collector plate 94; and when directing vanes 96 extend from collector plate 94 toward columnating plate 82 more than about one half the distance between collector plate 94 and columnating plate 82.

The outward extending end portions of directing vanes 96 are preferably connected to the inside wall of plenum 74, and the top edge of that portion of directing vanes 96 which lies under collector plate 94 is desirably connected, such as by tack welding or the like, to the bottom of collector plate 94. An auxiliary support rod 100 (not shown in FIG. 3) traversing plenum 74 beneath collector plate 94 can also be employed where desired to provide additional support and rigidity to inwardly extending end 102 of directing vanes 96. Where directing vanes 96 are not employed in combination with collector plate 94, it may be desirable to contour the surface of collector plate 94 so as to more evenly distribute the airflow to columnating plate 82.

According to a preferred embodiment of the invention, outside wall 20 and inside wall 22 of heating cabinet 16, shroud 64, plenum 74, columnating assembly 76, collector plate 94 and directing vanes 96 are all constructed from metal such as stainless steel or aluminized steel. However, where the subject apparatus is used for cooling or the like, it is understood that plastic can be utilized under some conditions in place of stainless steel or aluminized steel for parts such as columnating assembly 76, collector plate 94, directing vanes 96 and the like.

As shown in FIG. 1 and 2, first pan 104 and second pan 106 are provided for supporting food products in a substantially horizontal position beneath columnating assembly 76. First pan 104 and second pan 106 are in turn supported and maintained in substantially parallel and spaced apart relation by wire racks 108, 110 respectively to permit the circulation of air both over and under the two pans. Food products supported in first pan 104 are subjected to the substantially vertical jets of impingement air discharged through orifices 92 in jet plate 84. Food products supported in second pan 106 are not subjected to impingement heating since the flow of impingement air is blocked by first pan 104. Notwithstanding this fact, however, plenum 74 and columnating assembly 76 are preferably adapted to provide an alternating, substantially horizontal convective flow of heated air across the surface of food products disposed in second pan 106.

An alternating, substantially horizontal convective flow of heated air across second pan 106 can be achieved by providing reciprocal horizontal motion between columnating assembly 76 and second pan 106. According to the embodiment shown in FIGS. 1 and 2, this relative motion is provided by reciprocating plenum 74 and columnating assembly 76 in a horizontal plane while maintaining second pan 106 in a fixed position.

Plenum 74 is suspended in air recirculation zone 18 within heating cabinet 16 of apparatus 10 by plenum hangers 112 that are connected in fixed relation to horizontal support rods 114 that are in turn rotatably mounted in plenum support brackets 116 connected to top inside wall 22 of heating cabinet 16. The lower ends of plenum hangers 112 are pivotally connected to lower plenum connector rods 118 extending longitudinally between plenum connector brackets 120 attached to the outside wall of each side of plenum 74. Reciprocating rotational motion is applied to one of the two horizontal support rods 114 by linkage 122 that is eccentrically connected to output shaft 124 of reciprocating drive motor 126 mounted on heating cabinet 16 inside motor housing 14. Because plenum hangers 112 are connected in fixed rotational relation to horizontal support rods 114 and because the lower ends of plenum hangers 112 are pivotally connected to plenum connector rods 118, the reciprocating rotational motion of horizontal support rods 114 is converted to a horizontal translational motion in plenum 74 and in columnating assembly 76 connected thereto. Flange portions 72 of plenum 74 cooperate with flange portions 70 of fan shroud 64 as referred to previously to permit sliding engagement therebetween. Thus, as output shaft 124 of reciprocating drive motor 126 rotates, plenum 74 reciprocates from side to side in a substantially horizontal plane while axial fan blade 62, fan shroud 64 and first and second pans 104, 106 remain in a fixed position relative to heating cabinet 16.

Means for providing relative translational motion between opposed structural members are well known, and it will be apparent to one of ordinary skill in the art upon reading this application that the mechanical configuration disclosed herein for providing reciprocal translational motion between plenum 74 and columnating assembly 76 on the one hand and pans 104, 106 on the other hand is not critical to the present invention. However, the relative translational motion between columnating assembly 76 and pans 104, 106 that enables an alternating, horizontal convective airflow to be applied to food products disposed in second pan 106 is significant. As shown in FIG. 1, plenum 74 is centrally disposed within heating cabinet 16 and all of orifices 92 in jet plate 84 are downwardly directed so as to impinge against the surface of food products maintained in first pan 104. If plenum 74 is then caused to move to its left-most position, as shown by phantom lines 128, the jets of impingement air directed downward by the outer-most orifices 92a will not impinge against the surface of food products in first pan 104, but will flow downward through support rack 108 and then horizontally across the interior of heating cabinet 16 between first pan 104 and second pan 106. When plenum 74 and columnating assembly 76 thereafter reciprocate to the position indicated by phantom lines 130, impingement air emanating from outermost jets 92b will flow downward around first pan 104 and from right to left between first pan 104 and second pan 106, reversing the flow of convection air across the food products disposed therein.

In some applications, it may be preferable to initially insert food products into apparatus 10 by placing them in the position shown by first pan 104 and subjecting them to an interval of intensive heat transfer by impingement heating. The pan can then be lowered to the position of second pan 106 and thermal energy can be applied at a less intensive rate by the alternating, horizontal convective airflow while another batch of food products is subjected to intensive impingement heating at the higher level.

Also, according to another embodiment of the invention, electrical heating elements can be incorporated into support members 108, 110 and can be independently thermostated to provide conductive heat flow to the lower surface of food products disposed thereon as desired. In this manner, it is possible to contact the upper surfaces of a food product with air at one temperature while simultaneously controlling the temperature of the lower surfaces of the food products at the same or a different level. Also, as is discussed in more detail in relation to FIG. 5, means can be provided within heating cabinet 16 for automatically controlling and adjusting the height at which food products are maintained relative to columnating apparatus 76.

To promote the effectiveness of columnating assembly 176 in directing an alternating, horizontal convective flow of air back and forth across the interior feeding cabinet 16 beneath first pan 104, the width of first pan 104 relative to the range of translational motion of columnating assembly 76 should be such that a sufficient number of orifices extend outwardly past the edge of first pan 104 to permit a substantial flow of air to pass beneath that pan.

According to another embodiment of the invention wherein it is desired to humidify food product, a pan of water can be substituted in place of second pan 106 so that the alternating, horizontal convective airflow can be humidified as it passes over the water surface prior to being recirculated through axial flow fans 62.

The spent air rebounding from the surface of food products in first pan 104 and the convection air passing over the food products second pan 106 are drawn upward around plenum 74 and past electrical heating elements 132 prior to reentering inlet port 78 of shroud 64 behind axial fan blade 62. Vent pipe 134 is provided for filtering or otherwise exhausting smoke, entrained grease and the like from air recirculation zone 18 inside heating cabinet 16.

Figure 5:
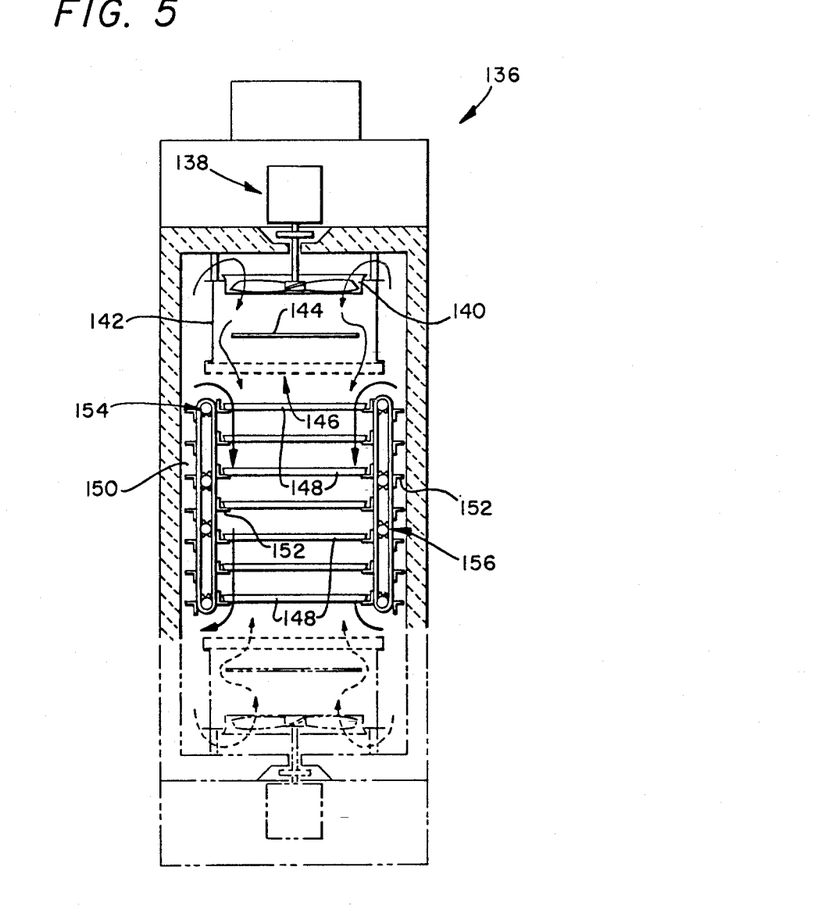
FIG. 5 is a simplified sectional front elevation view of an embodiment of the invention wherein impingement air is applied from both the top and (shown in phantom) bottom of the apparatus and in which spaced apart, horizontal layers of food products are cycled vertically through the apparatus.

As previously stated, the number of vertically spaced pans disposed within a single cabinet can vary, for example, according to the required intensity of heat transfer, the geometry and composition of the food products and the overall space limitations for a given apparatus. One such alternative embodiment of the apparatus of the present invention is depicted in simplified form in FIG. 5. Referring to FIG. 5, impingement heating apparatus 136 comprises an axial flow fan assembly 138 adapted to form downwardly directed columnated jets of a temperature control gas by means of shroud 140, plenum 142, collector plate 144 and columnating assembly 146. A plurality of vertically spaced pans 148 are supported within thermal treatment zone 150 by means of support brackets 152 connected to opposed continuous drive assemblies 154, 156. As shown in FIG. 5, there is no relative motion in the horizontal direction between columnating assembly 146 and pans 148. With the configuration shown in FIG. 5, food products are preferably inserted into the apparatus at the level nearest to columnating assembly 146. This permits the most intensive transfer of thermal energy to take place immediately after introducing the food products into the apparatus. By progressively heating, cooling, drying or humidifying food products in this manner, depending upon the particular application, the "slugging" effects commonly experienced with conventional apparatus employing stacked layers of food products can be avoided.

As a further alternative to the embodiment disclosed in FIG. 5, a second, upwardly directed impingement airflow apparatus as shown in phantom can be utilized to progressively increase the heat applied to the bottom surface of the food products as the heat applied to the top surface is progressively decreased. The configuration shown in phantom is particularly effective where the food products are placed on wire racks instead of the pans 148 that are supported between bracket 152.

Other alterations and modifications of the present invention will become apparent to those of ordinary skill in the art upon reading the present disclosure and it is intended to cover all such modifications as fall within the scope of the appended claims.

What is claimed is:

1. Apparatus for thermally treating food products, said apparatus comprising: a cabinet; a fan disposed within said cabinet, said fan being adapted to discharge a pressurized flow of a temperature controlled gas; a columnating assembly disposed in said cabinet, said columnating assembly being adapted to divide the temperature controlled gas discharged by said fan into a plurality of columnated jets of temperature controlled gas; a plenum having walls adapted to direct the temperature controlled gas discharged from said fan toward said columnating assembly; and a plurality of spaced food support racks disposed within said cabinet to maintain said food product beneath the columnated jets of temperature controlled gas discharged from said columnating assembly, said racks being adapted to permit the convective flow of said temperature controlled gas between adjacent racks, said plenum and said columnating assembly being further adapted to provide alternating, horizontal convective airflow to at least one layer of food products.

2. The apparatus of claim 1 wherein said food products are cooled by said temperature controlled gas.

3. The apparatus of claim 1 further comprising means for adjusting the humidity of said temperature controlled gas.

4. Apparatus for thermally treating food products by directing a temperature controlled gas against said food products comprising an axial flow fan adapted to discharge said temperature controlled gas in the direction of said food products, at least one orifice plate disposed in parallel and spaced apart relation to said axial flow fan between said axial flow fan and said food products, and a collector plate disposed between said axial flow fan and said orifice plate in parallel and spaced apart relation thereto; and a directing vane disposed on the side of the collector plate opposite the fan.

5. The apparatus of claim 1 wherein the distance between said directing vane and said orifice plate is less than about one half the distance between said collector plate and said orifice plate.

6. Apparatus for thermally treating food products by directing a temperature controlled gas against said food products comprising an axial flow fan adapted to discharge said temperature controlled gas in the direction of said food products, two parallel and spaced apart orifice plates having concentrically aligned, spaced orifices disposed therein, said orifices being further disposed in spaced vee-shaped rows to provide channels between said rows, the spacing between said vee-shaped rows being greater than the spacing between the orifices within said rows, said orifice plates being disposed in parallel and spaced apart relation to said axial flow fan between said axial flow fan and said food products, and a collector plate disposed between said axial flow fan and said orifice plate in parallel and spaced apart relation thereto.

7. Apparatus for thermally treating food products, said apparatus comprising a cabinet; an axial flow fan disposed within said cabinet, said fan being adapted to discharge a pressurized flow of a temperature controlled gas in the direction of said food products; a columnating assembly disposed in parallel and spaced apart relation to said axial flow fan, said columnating assembly being further adapted to divide the temperature controlled gas discharged thereby into a plurality of columnated jets of temperature controlled gas; a plenum adapted to direct the temperature controlled gas discharged from said axial flow fan toward said columnating assembly; a collector plate disposed in parallel and spaced apart relation between said axial flow fan and said columnating assembly within said plenum; food support means disposed within said cabinet to maintain said food product beneath the columnated jets of temperature controlled gas discharged from said columnating assembly; and means for providing reciprocating relative translational motion between said columnating assembly and said food support means.

8. Apparatus for thermally treating food products, said apparatus comprising a cabinet; an axial flow fan disposed within said cabinet, said fan being adapted to discharge a pressurized flow of a temperature controlled gas in the direction of said food products; a columnating assembly disposed in parallel and spaced apart relation to said axial flow fan, said columnating assembly being further adapted to divide the temperature controlled gas discharged thereby into a plurality of columnated jets of temperature controlled gas; a plenum adapted to direct the temperature controlled gas discharged from said axial flow fan toward said columnating assembly; a collector plate disposed in parallel and spaced apart relation between said axial flow fan and said columnating assembly within said plenum; and a plurality of parallel and spaced apart food support racks disposed within said cabinet to maintain said food product beneath the columnated jets of temperature controlled gas discharged from said columnating assembly, said racks being adapted to permit the convective flow of said temperature controlled gas therebetween, said plenum and said columnating assembly being further adapted to provide alternating, horizontal convective airflow to at least one layer of food products.

9. Apparatus for thermally treating food products, said apparatus comprising a cabinet; an axial flow fan disposed within said cabinet, said fan being adapted to discharge a pressurized flow of a temperature controlled gas in the direction of said food products; a columnating assembly disposed in parallel and spaced apart relation to said axial flow fan, said columnating assembly being further adapted to divide the temperature controlled gas discharged thereby into a plurality of columnated jets of temperature controlled gas plenum adapted to direct the temperature controlled gas discharged from said axial flow fan toward said columnating assembly; a collector plate disposed in parallel and spaced apart relation between said axial flow fan and said columnating assembly within said plenum; and food support means disposed within said cabinet to maintain said food product beneath the columnated jets of temperature controlled gas discharged from said columnating assembly, said food support means being adapted to provide conductive heat transfer to the lower surface of said food product.

10. The apparatus of claim 9, further comprising means for controlling the temperature of said food support means independently of the temperature of said temperature controlled gas.

11. Apparatus for thermally treating food products, said apparatus comprising a cabinet; an axial flow fan disposed within said cabinet, said fan being adapted to discharge a pressurized flow of a temperature controlled gas in the direction of said food products; a columnating assembly disposed in parallel and spaced apart relation to said axial flow fan, said columnating assembly being further adapted to divide the temperature controlled gas discharged thereby into a plurality of columnated jets of temperature controlled gas; a plenum adapted to direct the temperature controlled gas discharged from said axial flow fan toward said columnating assembly; a collector plate disposed in parallel and spaced apart relation between said axial flow fan and said columnating assembly within said plenum; a plurality of parallel and spaced apart food support racks disposed within said cabinet to maintain said food product beneath the columnated jets of temperature controlled gas discharged from said columnating assembly, said racks being adapted to permit the convective flow of said temperature controlled gas therebetween; and means for progressively lowering a layer of food products disposed thereon from a first position where said food products are contacted by impinging jets of a temperature controlled gas to a second position that is farther removed from said columnating assembly.

12. Apparatus for thermally treating food products, said apparatus comprising a cabinet; an axial flow fan disposed within said cabinet, said fan being adapted to discharge a pressurized flow of a temperature controlled gas in the direction of said food products; a columnating assembly disposed in parallel and spaced apart relation to said axial flow fan, said columnating assembly being further adapted to divide the temperature controlled gas discharged thereby into a plurality of columnated jets of temperature controlled gas; a plenum adapted to direct the temperature controlled gas discharged from said axial flow fan toward said columnating assembly; a collector plate disposed in parallel and spaced apart relation between said axial flow fan and said columnating assembly within said plenum; a directing vane disposed on the side of the collector plate opposite to the axial flow fan; and food support means disposed within said cabinet to maintain said food product beneath the columnated jets of temperature controlled gas discharged from said columnating assembly.

13. Apparatus for thermally treating food products, said apparatus comprising: a cabinet; a plurality of parallel and spaced apart food support racks disposed within said cabinet, said rack supporting a plurality of layers of food products; heater means adjacent one end of said racks, said heater means being adapted to transfer heat to a first layer of food products; and means circulating air adjacent said first layer of food product, said racks being adapted to permit convective flow of heated gas between adjacent layers of food products to provide alternating horizontal convective air flow to at least one additional layer of food products spaced from said first layer of food products.

14. Apparatus according to claim 13, said food support racks comprising: a food support assembly adapted to progressively cycle layers of food products such that each layer is progressively moved adjacent said heater means and is thereafter subjected to the alternating, horizontal convective air flow.

15. Apparatus according to claim 14, said food support assembly being further adapted to conductively heat the lower surface of food products disposed thereon while upper surfaces of the food products are being subjected to horizontal convective heating.

16. Apparatus according to claim 15, said heater means comprising: a columnating assembly in said cabinet adapted to form a plurality of columnated jets of temperature controlled air; and means directing said columnated jets of temperature controlled air to impinge upon said first layer of food product.

* * * * *

UNITED STATES PATENT AND TRADEMARK OFFICE
CERTIFICATE OF CORRECTION

PATENT NO. : 4,750,276

DATED : June 14, 1988

INVENTOR(S) : Donald P. Smith; Virgil L. Archer; William W. Plumb; Jarald E. High and Robert W. Foreman It is certified that error appears in the above-identified patent and that said Letters Patent is hereby corrected as shown below:

In Column 10, line 61, after the word "gas" add -- ; a --.

Signed and Sealed this

First Day of November, 1988

Attest:

DONALD J. QUIGG

Attesting Officer

Commissioner of Patents and Trademarks